United States Patent
Monogioudis et al.

(10) Patent No.: US 7,430,237 B2
(45) Date of Patent: Sep. 30, 2008

(54) DECODERLESS BIT-ERROR-RATE ESTIMATION FOR CONVOLUTIONALLY ENCODED TRANSMISSIONS IN WIRELESS SYSTEMS

(75) Inventors: Pantelis Monogioudis, Randolph, NJ (US); Kiran M Rege, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1660 days.

(21) Appl. No.: 09/788,715

(22) Filed: Feb. 20, 2001

(65) Prior Publication Data

US 2003/0142727 A1     Jul. 31, 2003

(51) Int. Cl.
*H04B 3/46* (2006.01)
*H04B 17/00* (2006.01)
*H04Q 1/20* (2006.01)

(52) U.S. Cl. .............. 375/227; 375/225; 375/285; 375/346; 455/63.1; 455/226.3

(58) Field of Classification Search .......... 375/227, 375/225, 284, 278, 285, 346; 455/63.1, 67.13, 455/226.3, 226.1
See application file for complete search history.

(56) References Cited

U.S. PATENT DOCUMENTS

| | | | |
|---|---|---|---|
| 5,214,687 A | 5/1993 | Känsäkoski et al. | 379/60 |
| 5,864,589 A | 1/1999 | Mourot et al. | 375/341 |
| 6,141,388 A | 10/2000 | Servais et al. | 375/262 |
| 6,154,489 A * | 11/2000 | Kleider et al. | 375/221 |
| 7,020,102 B2 * | 3/2006 | Tuomainen et al. | 370/311 |
| 2004/0004945 A1 * | 1/2004 | Monsen | 370/328 |

FOREIGN PATENT DOCUMENTS

WO      WO 00/13348      *  3/2000
WO      WO 0013348 A1  *  3/2000

OTHER PUBLICATIONS

Sklar, "Digital Communications", published 1988 by PTR Prentice Hall, p. 8.*
"IEEE 100 The Authoritative Dictionary of IEEE Standard Terms", published in 2000, by the IEEE , Inc., p. 710.*
U.S. Appl. No. 09/763,989.*
U.S. Appl. No. 09/763,989, filed Feb. 27, 2001.*
Nanda, S. et al.: "Frame Error Rates for Convolutional Codes on Fading Channels and the Concept of Effective Eb/NO", Global Telecommunications Conference (GLOBECOM), 1995, IEEE Singapore Nov. 13-17, 1995 New York, NY, pp. 27-32, XP010159466.
Sanjiv Nanda and Kiran M. Rege, "Error Performance of Convolutional Codes in Fading Environments: Heuristics for Effective $E_b/N_o$ Computation," *Proceedings of the Conference on Information Sciences and Systems*, Princeton, 1996.

* cited by examiner

*Primary Examiner*—Phuong Phu

(57) ABSTRACT

In a UMTS (universal mobile telecommunications system) based system, a wireless receiver implements "effective signal-to-noise ($E_b/N_o$) based BER estimation." In particular, the wireless receiver comprises a rake receiver, a processor and memory. The rake receiver processes a received signal and provides signal-to-noise ratio values for each slot of each received frame of the received signal. The processor converts these signal-to-noise ratio values for each received frame into an effective signal-to-noise ratio value for the received signal. The processor then uses the effective signal-to-noise ratio value as a pointer, or index, into a look-up table (stored in the memory) and retrieves a BER estimate therefrom.

8 Claims, 5 Drawing Sheets

FIG. 3

| $[E_b/E_o]_{eff}$ | BER estimate |
|---|---|
| 0.5 | .065 |
| 1.0 | .025 |
| 1.5 | .007 |
| ••• | ••• |
| 2.5 | .00038 |

Look-up Table

DECODERLESS BIT-ERROR-RATE ESTIMATION FOR CONVOLUTIONALLY ENCODED TRANSMISSIONS IN WIRELESS SYSTEMS

CROSS-REFERENCE TO RELATED APPLICATIONS

Related subject matter is disclosed in the co-pending, commonly assigned, U.S. Patent applications of Rege, entitled "A Non-Adaptive Symbol Error Count Based Technique for CDMA Reverse Link Outer Loop Power Control," application Ser. No. 09/052,581, filed on Mar. 31, 1998; and "An Adaptive Symbol Error Count Based Technique for CDMA Reverse Link Outer Loop Power Control," application Ser. No. 09/052,696, filed on Mar. 31, 1998; and the co-pending, commonly assigned, U.S. Patent application of Monogioudis et al., entitled "Bit Error Rate Based Reverse Link Outer Loop Power Control with Adaptive Compensation," application Ser. No. 09/514,608, filed Feb. 28, 2000.

FIELD OF THE INVENTION

This invention relates generally to communications and, more particularly, to wireless systems.

BACKGROUND OF THE INVENTION

Many of the bearer services that will be available over 3 G (Third Generation) Wireless Systems such as UMTS (universal mobile telecommunications system) use block-based transmissions that, although protected by a Cyclic Redundancy Check (CRC), possess long transmission time intervals (TTI) that make necessary the estimation of bit error probability within the block and before the CRC is checked. As such, to provide some limited error protection these bearer services can employ convolutional or turbo encoding. In addition, these services typically require provisioning a certain Quality of Service (QoS) that is specified in terms of the average Bit-Error-Rate (BER) as seen by the end user. To that end, a wireless receiver needs to provide a BER estimate from the convolutional or turbo encoded received signal to support these services and their ability to deliver the desired QoS to the end user.

For bearer services employing turbo encoding, it is known in the art that a receiver can provide BER estimates for a received signal by using iterative decoding methods based on Maximum Aposteriori Probability (MAP) decoders or variants thereof (such as log-MAP, or Soft Output Viterbi Algorithm (SOVA)). These methods produce soft outputs representing the aposteriori log likelihood ratios for the received bits. From these soft outputs, BER estimates are computed in a straightforward manner.

In contrast, for those bearer services employing a convolutional coding scheme, there is a need to provide a method and apparatus to estimate the bit error rate—and, therefore, provide the ability to estimate the QoS as seen by the end user.

SUMMARY OF THE INVENTION

In accordance with the invention, a receiver processes a received wireless signal to generate a signal-to-noise ratio of the received wireless signal. The receiver provides a Bit-Error-Rate (BER) estimate for the received wireless signal as a function of the signal-to-noise ratio.

In an embodiment of the invention, a wireless receiver, of a UMTS (universal mobile telecommunications system) based system, implements "effective signal-to-noise ($E_b/N_o$) based BER estimation." In particular, the wireless receiver comprises a rake receiver, a processor and memory. The rake receiver processes a received signal and provides signal-to-noise ratio values for each slot of each received frame of the received signal. The processor converts these signal-to-noise ratio values for each received frame into an effective signal-to-noise ratio value for the received signal. The processor then uses the effective signal-to-noise ratio value as a pointer, or index, into a look-up table (stored in the memory) and retrieves a BER estimate therefrom. As a result, this BER estimation technique does not require use of the output signal from a convolutional decoder—it is a decoderless Bit-Error-Rate (BER) Estimation technique.

BRIEF DESCRIPTION OF THE DRAWING

FIG. 3 shows an illustrative look-up table for use in the portion of the wireless endpoint of FIG. 1.

DETAILED DESCRIPTION

This description is broken into two parts. The first part describes an illustrative embodiment of the inventive concept. The second part provides material on the analytical basis for the invention and relevant equations.

1. Decoderless Bit-Error-Rate (BER) Estimation

In accordance with the invention, a wireless endpoint estimates the bit-error-rate (BER) of a received wireless signal without requiring use of the output signal from a convolutional decoder. In particular, the wireless endpoint processes a received wireless signal to generate a signal-to-noise ratio of the received wireless signal. The wireless endpoint develops a BER estimate for the received wireless signal as a function of the signal-to-noise ratio.

Figure 1:
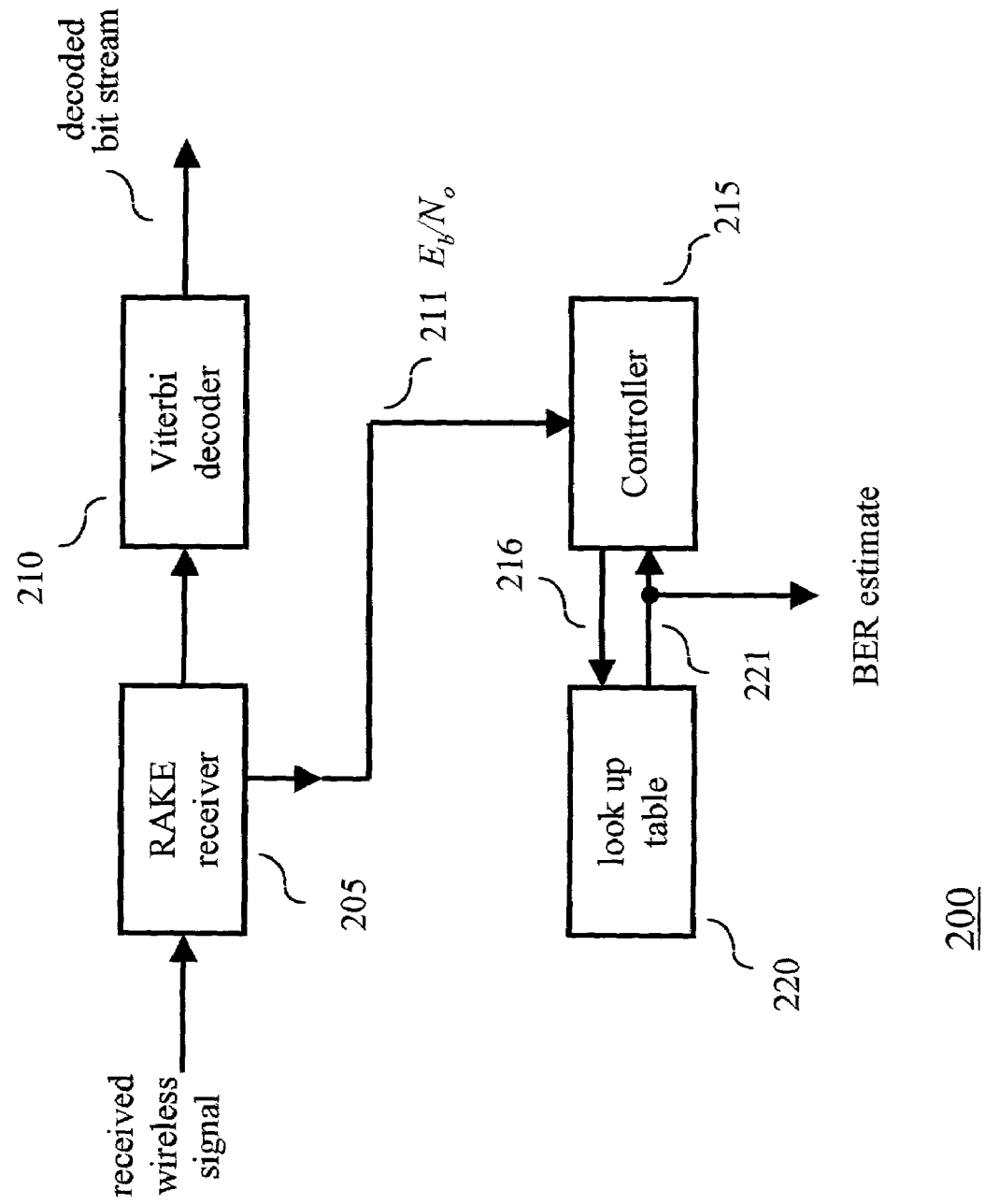
FIG. 1 shows a portion of a wireless endpoint embodying the principles of the invention.

FIG. 1 shows a portion of a wireless endpoint 200 embodying the principles of the invention. Other than the inventive concept, the elements shown in FIG. 1 are well-known and will not be described in detail. For example, controller 215 is representative of a stored-program-controlled processor with associated memory (not shown, except for look-up table 220) as known in the art. Also, only that portion of wireless endpoint 200 related to the inventive concept is shown, e.g., other processing by wireless endpoint 200 of a received signal is not described. Further, a detailed description of the receiving and demodulation of a wireless signal is not necessary for the inventive concept and, as such, has been simplified. Except as noted below, it is assumed that the wireless endpoint 200 is a part of a Code Division Multiple Access (CDMA) based (e.g., IS-95, CDMA2000, UMTS) mobile communications system and is in communication with another wireless endpoint (not shown). Wireless endpoint 200 is representative of any wireless device, e.g., a base station, mobile station, etc.).

In an illustrative embodiment of the invention, wireless endpoint 200 implements "effective signal-to-noise ($E_b/N_o$) based BER estimation." Wireless endpoint 200 comprises RAKE receiver 205, Viterbi decoder 210, controller 215 and look-up table 220. RAKE receiver 205 processes a received wireless signal for demodulation and provides a symbol stream to Viterbi decoder 210. The latter provides a decoded bit stream. RAKE receiver 205 also processes the received wireless signal to provide signal-to-noise ratio values (via signal 211) for each slot of each received frame of the received wireless signal. (As known in the art, the received wireless signal is formatted in "frames," each frame comprising a number of "slots" (not described herein).) As described further below, controller 215 converts these signal-to-noise ratio values for each received frame into an effective signal-to-noise ratio value for the received wireless signal. Controller 215 then uses the effective signal-to-noise ratio value as a pointer (via signal 216), or index, into look-up table 220 (stored in the memory) and retrieves a BER estimate therefrom (via signal 221). As a result, the wireless endpoint 200 performs a BER estimation technique that does not require use of the output signal from a convolutional decoder—it is a decoderless Bit-Error-Rate (BER) Estimation technique.

Figure 2:
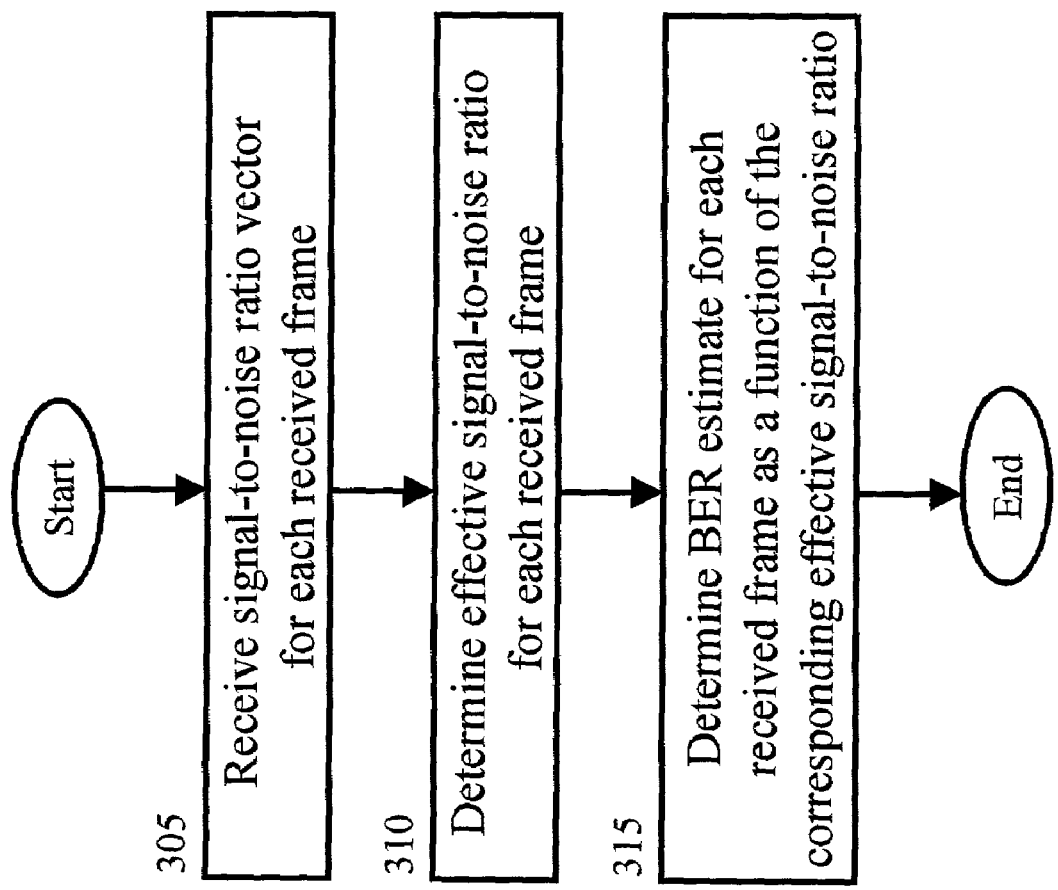
FIG. 2 shows an illustrative flow chart embodying the principles of the invention.

At this point, reference should also be made to FIG. 2, which shows an illustrative flow chart embodying the principles of the invention. (The inventive concept is implemented using conventional programming techniques, which as such, will not be described herein.) In step 305, for each received frame, controller 215 receives its associated $E_b/N_o$ vector, $\underline{E_b/N_o}$. In step 310, controller 215 determines, for each received frame, the effective $E_b/N_o$, $[E_b/N_o]_{eff}$, in accordance with the mapping given in equation (7) (described below). For each received frame, once $[E_b/N_o]_{eff}$ is determined, controller 215 obtains an estimate of the local BER for that received frame by using the effective signal-to-noise ratio value as a pointer (via signal 216 of FIG. 1), or index, into look-up table 220 and retrieves a BER estimate therefrom (via signal 221 of FIG. 1). (Although not described herein, it should be noted that suitable averaging/filtering techniques can be used to derive a time average of the BER estimate for a desired time-frame.)

Figure 5:
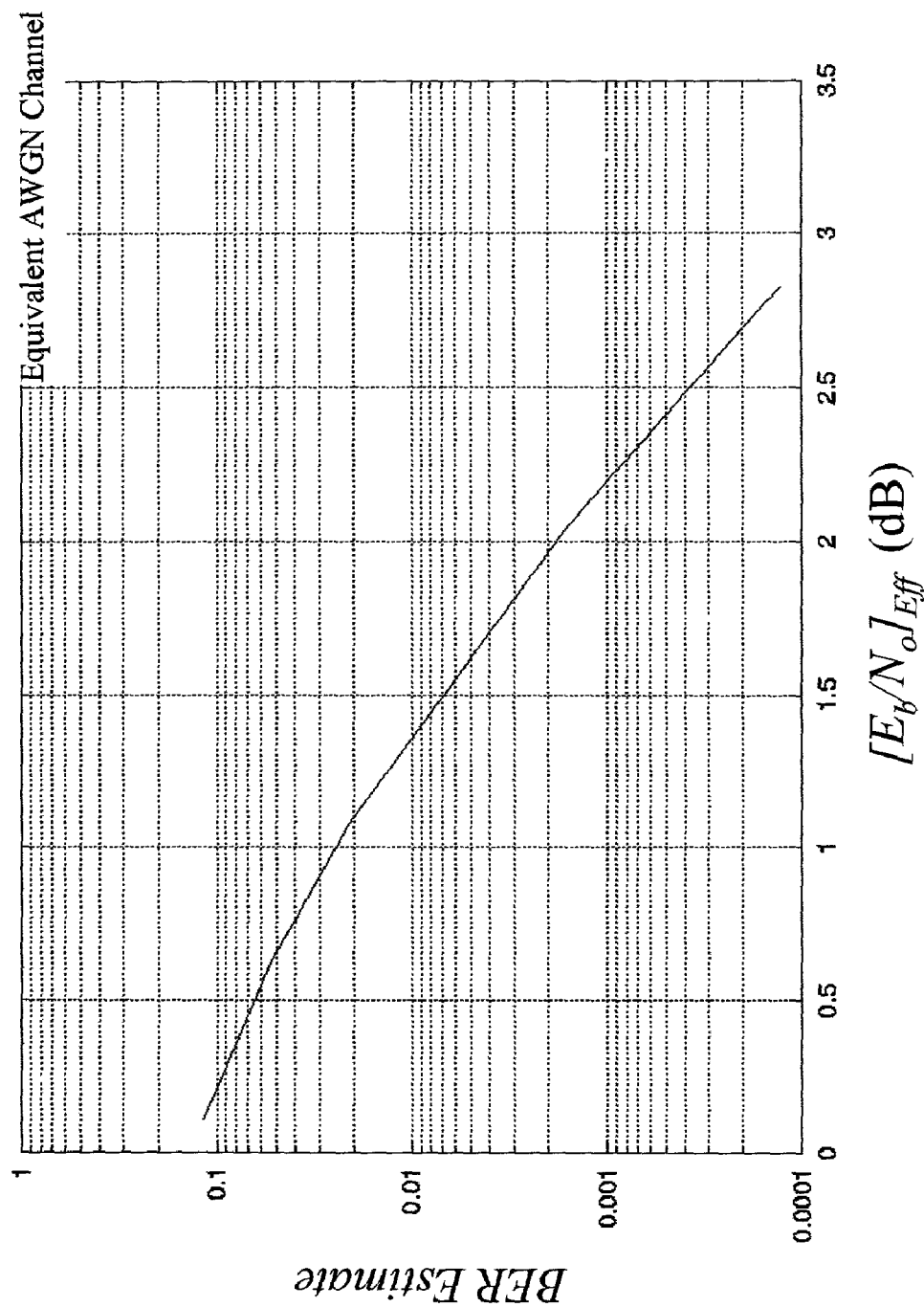

An illustrative look-up table is shown in FIG. 3. It is assumed that controller 215 suitably rounds an effective signal-to-noise ratio value to the closest value stored in look-up table 220. (Also, illustrative values for effective signal-to-noise ratio values versus BER estimates is shown in FIG. 5 (described below)).

It should be noted that, instead of a look-up table, controller 215 could calculate the BER estimate by using an equivalent mapping, such as illustrated in equation (8) (described below).

2. Analysis

For the purposes of analysis, it is assumed that the communication system of interest is similar to the downlink of in an IS-95 based wireless system operating at Rate Set 1 which uses a ½ rate convolutional code with interleaving as specified in TIA/EIA/IS-95 Interim Standard, *Mobile Station— Base Station Compatibility Standard for Dual-Mode Wide Band Cellular Systems*, Telecommunication Industries Association, July 1993.

This method is based on the concept of effective signal-to-noise ratio ($E_b/N_o$) (e.g., see Nanda, Sanjiv, and Rege, Kiran M., "Frame Error Rates for Convolutional Codes on Fading Channels and the Concept of Effective $E_b/N_o$," *Proceedings of IEEE Globecom*, Singapore, 1995; and Nanda, Sanjiv, and Rege, Kiran M., "Error Performance of Convolutional Codes in Fading Environments: Heuristics for Effective $E_b/N_o$ Computation," *Proceedings of the Conference on Information Sciences and Systems*, Princeton, 1996).

In the present context, the concept of effective $E_b/N_o$ is explained as follows. Consider a received frame and the variation of $E_b/N_o$ over the duration of this frame that is caused by the fading nature of a wireless channel. Assuming that the $E_b/N_o$ remains constant over a slot (i.e., a power control group in IS-95) but can vary from slot to slot, the $E_b/N_o$ variation over the frame can be represented by an N-dimensional vector $\underline{E_b/N_o}$. (For the IS-95 downlink, N equals 16.) The (local) bit error rate for this frame is a function of this vector $\underline{E_b/N_o}$, $$BER = f(\underline{E_b/N_o}), \quad (1)$$

where $f(.)$ is some function which has a vector argument.

Figure 4:
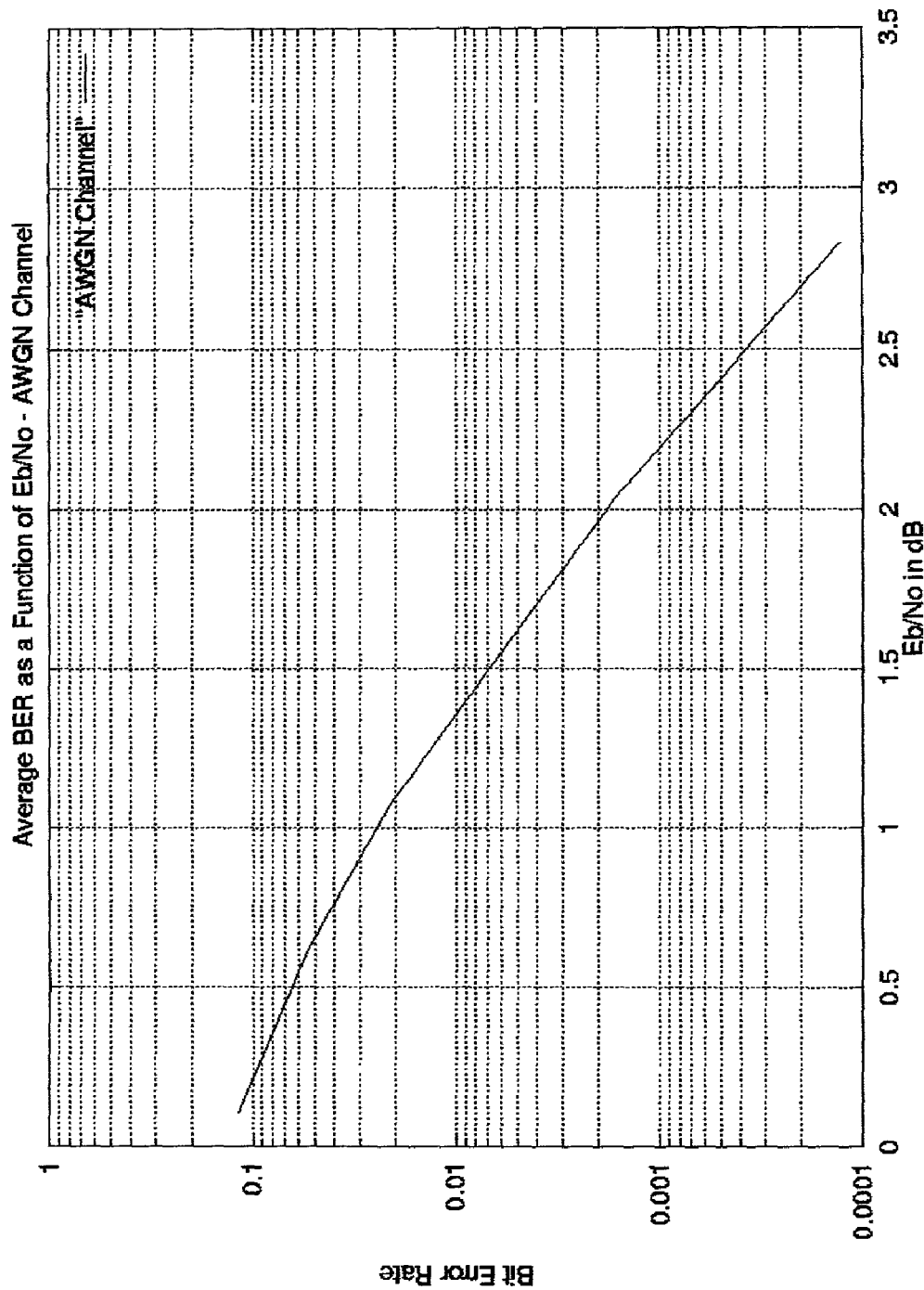
FIGS. 4-5 show illustrative graphs.

In an Additive White Gaussian Noise (AWGN) channel, it is well known that the bit error rate is a function of the channel $E_b/N_o$, which is a scalar since it remains constant over all slots. This relationship can be written as:

$$BER = h(E_b/N_o), \quad (2)$$

where the function $h(.)$ takes a scalar argument. FIG. 4 shows the relationship embodied in equation (2) as a function of the $E_b/N_o$ measured at the receiver. (A symbol level simulation of this system operating in an AWGN channel was run at different values of the receiver signal-to-noise ratio. The symbol level simulation assumes ideal channel estimation at the receiver.) An empirically determined approximation for the function $h(.)$ in equation (2) above is given by:

$$h(x) = \frac{336.5 \exp[-7.699 \exp(0.2303x)]}{1 + 672 \exp[-7.699 \exp(0.2303x)]}. \quad (3)$$

The above relationship can be used to map the $E_b/N_o$ (in dB) on an AWGN channel to the corresponding bit error rate.

In accordance with the invention, in a wireless environment it is desired to define an equivalent AWGN channel (with a constant $E_b/N_o$) for a given received frame and its associated vector $\underline{E_b/N_o}$. This equivalent AWGN channel is illustratively defined as that AWGN channel which has the same bit error rate as the original frame with its vector $\underline{E_b/N_o}$. Thus, the effective $E_b/N_o$ for the received frame, denoted by $[E_b/N_o]_{eff}$, is:

$$[E_b/N_o]_{eff} = h^{-1}[f(\underline{E_b/N_o})] = k(\underline{E_b/N_o}), \quad (4)$$

where the function $k(.)$ maps a vector $\underline{E_b/N_o}$ into a scalar, the effective $E_b/N_o$. In general, the function $k(.)$ is impossible to evaluate exactly. However, one can develop relatively simple heuristics to approximate the underlying relationship between $\underline{E_b/N_o}$ and $[E_b/N_o]_{eff}$. One heuristic for effective $E_b/N_o$ computation is described in the above-mentioned TIA/EIA/IS-95 Interim Standard and focuses on minimum weight error events.

In accordance with the inventive concept, the idea is to match the probability of the minimum weight error event in the original frame with its vector $\underline{E_b/N_o}$ and its equivalent AWGN channel. The underlying assumption is that if the $E_b/N_o$ value is found for the equivalent AWGN channel that matches the probability of the minimum weight error event (on the original channel), then the same $E_b/N_o$ value will yield a good match for the overall bit error rate as well. For a ½ rate convolutional code employed on a downlink of IS-95, the minimum weight error event stretches over a bit-segment of length 18 and is given by:

$$e[n] = [1,1,1,0,1,1,1,1,0,1,1,0,0,0,1,0,1,1], \quad (5)$$

where a '1' in the above sequence indicates a bit whose associated $E_b/N_o$ contributes to the error probability whereas a '0' indicates a bit whose $E_b/N_o$ is irrelevant to the error probability. The index n in the above definition ranges from 0 to 17, The error event could begin at any position in the bit sequence delivered to the end user. Now, a bound on the probability of a minimum weight error event beginning at a bit position i is a function of the $E_b/N_o$ value associated with itself (i.e., bit position i) and the $E_b/N_o$ values associated with those bits in the next 17 bit positions (in the original, i.e., deinterleaved, order) which correspond to a '1' in the bit pattern given in equation (5) above (e.g., see the above-mentioned articles by Nanda, Sanjiv, and Rege, Kiran M.).

Let $e_i[n]$ denote the bit pattern that begins in bit position i in the deinterleaved order and follows the pattern shown in equation (5) for the next 17 positions. Thus, for n=0, 1, 2, ..., 17; $e_i[n]=1$ if the $n^{th}$ bit in equation (5) equals 1, otherwise it is 0. Then, a bound on the probability of a minimum weight error event beginning at bit position i is given by:

$$Pr[ME_i] < \exp\{-[(E_b/N_o)_{i+0} \cdot e_i[0] + \qquad (6)$$
$$(E_b/N_o)_{i+1} \cdot e_i[1] + \ldots + (E_b/N_o)_{i+17} \cdot e_i[17]]\}/12,$$

where $Pr[ME_i]$ denotes the probability of a minimum weight error event beginning at bit position i (e.g., see the above-mentioned articles by Nanda, Sanjiv, and Rege, Kiran M.). Clearly, the bit position i where a minimum weight error event is most likely to begin is that which yields the lowest sum of $E_b/N_o$ values (in absolute, not dB, domain) as given in equation (6).

In accordance with the inventive concept, one can match the probability given in equation (6) into the equivalent AWGN channel. Since the corresponding $E_b/N_o$ sum in the equivalent AWGN channel is simply 12 times the (constant) $E_b/N_o$ associated with that channel, the effective $E_b/N_o$ is given by:

$$[E_b/N_o]_{\mathit{eff}} = \min\{[(E_b/N_o)_{i+0} \cdot e_i[0] + \qquad (7)$$
$$(E_b/N_o)_{i+1} \cdot e_i[1] + \ldots + (E_b/N_o)_{i+17} \cdot e_i[17]]\}/12.$$

Note that in the calculation of effective $E_b/N_o$ as shown in equation (7), in order to determine the $E_b/N_o$ associated with a bit, one needs to locate its position in the interleaved order since that determines the slot in which that bit gets transmitted, and, consequently, its $E_b/N_o$ value. This can be done in a fairly straightforward manner. Also, in view of the specific structure of the interleaver used on the downlink of IS-95, if it is assumed that $E_b/N_o$ remains constant over a slot, then only 16 values of the starting bit position i need to be looked at to determine the minimum in expression equation (7). This is because the $E_b/N_o$ sums repeat themselves with a period of 16.

In accordance with the inventive concept, the Effective $E_b/N_o$-Based BER Estimation technique is now be summarized as follows. For a given received frame with its associated $E_b/N_o$ vector, $\underline{E_b/N_o}$, determine the effective $E_b/N_o$, $[E_b/N_o]_{\mathit{eff}}$, through the mapping given in equation (7). Once $[E_b/N_o]_{\mathit{eff}}$ is determined, obtain an estimate of the local BER through the mapping $$B\hat{E}R = h([E_b/N_o]_{\mathit{eff}}),$$

where the function h(.), as given in equation (2), represents the relationship between the $E_b/N_o$ and the average BER for an AWGN channel. As such, the graph of FIG. 4, in accordance with the inventive concept, is re-used as shown in FIG. 5, to represent a mapping of $[E_b/N_o]_{\mathit{eff}}$ versus BER. Similarly, the function shown in equation (3) is re-used to map $[E_b/N_o]_{\mathit{eff}}$ on an AWGN channel to a corresponding BER:

$$h(x) = \frac{336.5 \exp[-7.699 \exp(0.2303x)]}{1 + 672 \exp[-7.699 \exp(0.2303x)]}. \qquad (8)$$

Note that the function h(.), as defined in equation (8), assumes that its argument represents an $E_b/N_o$ level expressed in dB. Therefore, one will have to convert the effective $E_bN_o$ computed via equation (7) to its dB value before one can map it into the corresponding BER estimate in equation (8). Once again, suitable averaging/filtering techniques can be used to derive a time average of the BER estimate for a desired time-frame.

It should be noted that the BER estimation technique presented here is meant for estimating the average bit error rate observed over a long period (e.g., at least 50 to 100 frames). This is not a limitation of the techniques themselves. Rather, this limitation is due to the fact that bit errors are a rather volatile phenomenon so that one needs a long observation period to obtain a relatively stable estimate. In a given operating environment, if one were to obtain a BER estimate for a relatively short observation period and compare it to the actual bit error rate for that period, one could easily find significant discrepancy between the two even when a sophisticated BER estimation technique is used. It is only after averaging the bit errors over a long period that one would be able to obtain a good match. This limitation has an important consequence as far as BER estimate based control schemes are concerned—they will have to be relatively slow-acting to avoid potential stability problems.

Also, it should be noted that the inventive concept is also applicable to performing rate calculations (or rate prediction). In particular, current CDMA-based systems provide dedicated channel that utilize power control (e.g., using a BER estimate as described above). However, future directions in CDMA may time multiplex a given channel, wherein the channel supports different data rates (e.g., higher data rates (hdr)). As such, instead of using a BER estimate to perform power control, the BER estimate may be used to perform rate control.

The foregoing merely illustrates the principles of the invention and it will thus be appreciated that those skilled in the art will be able to devise numerous alternative arrangements which, although not explicitly described herein, embody the principles of the invention and are within its spirit and scope. For example, this invention can be used in cellular-based simulations necessary for the performance evaluation of radio techniques. In these simulations there is a need to capture the bit error rate of mobiles that nevertheless are not simulated down to the symbol or chip level (so that a mere decoding would reveal their bit error rate) but rather the simulation resolution is as coarse as one time slot providing significant simulation time efficiencies. Also, although shown as a separate elements, any or all of the elements of FIG. 1 (e.g., Viterbi decoder 210) may be implemented in a stored-program-controlled processor (such as controller 215).

What is claimed:

1. A method for use in wireless equipment, the method comprising the steps of:
   receiving a convolutionally-encoded wireless signal comprising a plurality of frames;
   processing the received wireless signal to generate a signal-to-noise ratio value for each frame of the received wireless signal without convolutionally decoding the signal; and
   providing a Bit-Error-Rate (BER) estimate for the received wireless signal as a function of the signal-to-noise ratio values, the providing step further comprising generating an effective signal-to-noise ratio value from the signal-to-noise ratio values; and
   determining a value for the BER estimate from the effective signal-to-noise ratio value.

2. The method of claim 1 wherein the providing step further comprises the step steps of:
   retrieving, from a look-up table stored in a memory, a value for the BER estimate as a function of the effective signal-to-noise ratio value.

3. A method for use in wireless equipment, the method comprising the steps of:
   processing a received, convolutionally-encoded wireless signal comprising a plurality of frames to provide a signal-to-noise ratio value for each frame over a time period without convolutionally decoding the signal;
   generating an effective signal-to-noise ratio value from the signal-to-noise ratio values;
   determining a Bit-Error-Rate (BER) estimate for the received wireless signal as a function of the effective signal-to-noise ratio value.

4. The method of claim 3 wherein the determining step uses the effective signal-to-noise ratio value as an index into a table to retrieve the BER estimate therefrom.

5. Apparatus for use in wireless equipment, the apparatus comprising:
   a receiver element for demodulating a convolutionally-encoded received wireless signal comprising a plurality of frames and for providing a signal-to-noise ratio value for each frame of the received wireless signal without convolutionally decoding the signal; and
   a processor for providing a Bit-Error-Rate (BER) estimate for the received signal as a function of the signal-to-noise ratio values by determining an effective signal-to-noise ratio value from the signal-to-noise ratio values, and determining the BER estimate as a function of the effective signal-to-noise ratio value.

6. The apparatus of claim 5 wherein the processor further retrieves, from a look-up table stored in a memory, the BER estimate as a function of the effective signal-to-noise ratio value.

7. Apparatus for use in wireless equipment, the apparatus comprising:
   a RAKE receiver for demodulating a convolutionally-encoded received wireless signal comprising a plurality of frames and for providing a signal-to-noise ratio value for each frame of the received wireless signal before convolutionally decoding the signal;
   a convolutional decoder for processing the demodulated received wireless signal to provide a decoded bit stream; and
   a processor for providing a Bit-Error-Rate (BER) estimate for the received signal as a function of the signal-to-noise ratio values by determining an effective signal-to-noise ratio value from the signal-to-noise ratio values, and determining the BER estimate as a function of the effective signal-to-noise ratio value.

8. The apparatus of claim 7 wherein the processor further retrieves from a look-up table stored in a memory, the BER estimate as a function of the effective signal-to-noise ratio value.

* * * * *